(12) United States Patent
Ho et al.

(10) Patent No.: US 8,306,553 B2
(45) Date of Patent: Nov. 6, 2012

(54) METHOD AND SYSTEM FOR OBTAINING EMERGENCY CALLER LOCATION

(75) Inventors: Chi Fai Ho, Palo Alto, CA (US); Shin Cheung Simon Chiu, Palo Alto, CA (US)

(73) Assignee: TP Lab, Palo Alto, CA (US)

( * ) Notice: Subject to any disclaimer, the term of this patent is extended or adjusted under 35 U.S.C. 154(b) by 0 days.

(21) Appl. No.: 13/197,246

(22) Filed: Aug. 3, 2011

(65) Prior Publication Data
US 2011/0287782 A1  Nov. 24, 2011

Related U.S. Application Data

(63) Continuation of application No. 11/840,866, filed on Aug. 17, 2007, now Pat. No. 8,019,358, which is a continuation-in-part of application No. 11/182,219, filed on Jul. 14, 2005, now Pat. No. 7,272,402.

(51) Int. Cl.
*H04W 24/00* (2009.01)

(52) U.S. Cl. ............... 455/456.1; 455/404.1; 455/404.2; 455/456.2

(58) Field of Classification Search ........... 455/404.1–2, 455/456.1–3, 456.5–6, 521, 554.1; 379/37, 379/51, 67.1, 88.19, 88.2, 207.01, 219, 230
See application file for complete search history.

(56) References Cited

U.S. PATENT DOCUMENTS

| | | | | |
|---|---|---|---|---|
| 6,671,506 | B1 * | 12/2003 | Lee | 455/406 |
| 6,993,360 | B2 * | 1/2006 | Plahte et al. | 455/555 |
| 2002/0162029 | A1 * | 10/2002 | Allen et al. | 713/202 |
| 2004/0266456 | A1 * | 12/2004 | Bostrom et al. | 455/456.2 |

\* cited by examiner

*Primary Examiner* — Cong Tran
(74) *Attorney, Agent, or Firm* — North Shore Patents, P.C.; Michele Liu Baillie

(57) ABSTRACT

A method and system for determining if a phone has changed locations includes a subscriber phone equipment coupled to a phone system through a subscriber access line. The subscriber phone equipment includes a location test module and a datastore. The location test module includes a first subscriber access line identity for the subscriber access line. The datastore includes a first subscriber location for the first subscriber access line identity. The location test module obtains a second subscriber access line identity for the subscriber access line, obtains a second subscriber location for the second subscriber access line identity, and compares the first subscriber location and the second subscriber location. If the first subscriber location does not match the second subscriber location, then the subscriber phone equipment has changed locations. If the first subscriber location matches the second subscriber location, then the subscriber phone equipment has not changed locations.

20 Claims, 8 Drawing Sheets

METHOD AND SYSTEM FOR OBTAINING EMERGENCY CALLER LOCATION

CROSS-REFERENCE TO RELATED APPLICATIONS

This application is a continuation of U.S. patent application Ser. No. 11/840,866, entitled "Method and System for Obtaining Emergency Caller Location", filed on Aug. 17, 2007, now U.S. Pat. No. 8,019,358, which in turn is a continuation-in-part of U.S. patent application Ser. No. 11/182,219, entitled "Method and System for Obtaining Emergency Caller Location", filed on Jul. 14, 2005, now U.S. Pat. No. 7,272,402.

BACKGROUND OF THE INVENTION

1. Field

This invention relates generally to telecommunications, more specifically, to a method and system to provide location information for voice calls.

2. Related Art

Around the world there are many emergency telephone numbers. For example, in the United States of America, the three-digit telephone number "911" is designated as the universal emergency telephone number. In the case of an emergency, a person can call 911 to reach an operator who can dispatch appropriate emergency services. To help provide the timeliest response, it is helpful and often necessary to have the location of the caller reported to the emergency service dispatcher. This is feature is of utmost importance when the caller is a young child, someone who is very ill or injured or otherwise unable to effectively communicate their location to the emergency services dispatcher. For these services to function properly, the telephone service provider must have means of identifying and reporting the location of the emergency caller.

In a typical scenario, when a subscriber subscribes to a residential telephone service from a service provider, the service provider assigns a telephone number for that subscription and allocates an access line to the subscriber's residence for the service. The access line connects to a telephone system of the residential telephone service. A user connects a telephone to the access line and uses the telephone to receive the residential telephone service.

The location of the subscription is the connecting point of the access line and the telephone. The location is typically the street address of the subscriber's residence. The service provider submits the telephone number and the location of the subscription to create a record in an Automatic Location identity (ALI) database. The record maps the telephone number to the location of the subscription. One of the usages of ALI database is for Emergency call purpose.

When a caller uses the telephone to make an emergency call by dialing "911", the telephone system determines the telephone number associated with the subscription. The telephone system sends a call request to a 911 selective router telephone system. The call request includes the telephone number.

The 911-selective router telephone system receives the telephone number in the call request and retrieves from the ALI database the location of the subscription based on the telephone number. The location is presumably where the caller of the emergency call is. The 911-selective router telephone system uses the location to select a Public Safety Answering Point (PSAP), which is a telephone system. The 911-selective router telephone system further sends the emergency call request to the PSAP. The call request also includes the telephone number.

The PSAP presents the emergency call to an emergency call agent. The PSAP also retrieves from the ALI database the location of the subscription based on the telephone number in the emergency call request, and informs the emergency call agent of the location from which the call originated. The agent uses the location to dispatch emergency personnel and services.

Recently, various service providers have been rolling out new telephone services. These telephone services include cellular telephone services, and Voice over IP (VoIP) telephone services. Although these telephone services are not the same as traditional residential telephone services, they are either marketed as residential telephone services or subscribers use them as if they are equivalent to residential telephone services. Many consumers mistakenly assume that 911 or emergency services will be available in these new telephone services as they are in traditional residential telephone services. However this is often not the case. Cellular and VoIP telephone services, due to their ability to move from one physical location to another, present a fairly complex problem when it comes to providing emergency call services. Especially when those services are highly dependent on knowing from whence the emergency call is being made.

In the case of VoIP telephone service, a user receives VoIP telephone service by connecting an IP telephone to a VoIP telephone system via the Internet. In one scenario, the IP telephone may be connected to a home DSL broadband Internet access gateway. It is also possible to connect the same IP telephone to a neighbor's Cable Modem broadband Internet access gateway. As a further convenience, is it also possible to connect an IP telephone to the IP network of a hotel during an out-of-town trip. In each example, the IP telephone is used to receive VoIP telephone service. While the convenience of being able to travel to any location with an appropriate Internet access, there is a danger associated with assuming that emergency services will be available on the IP telephone as on a regular telephone. To illustrate this danger, consider the following scenario.

While out of town, a user has an accident or encounters an emergency. The user calls 911 on an IP telephone that they have brought from home. The user assumes the 911-emergency call center would know her location, and expects emergency services to arrive in a short period of time. When the emergency call is not answered or when emergency services do not arrive in an hour, the user panics. Whilst in the hotel, the user's spouse calls the user's IP telephone number from their home concerned that emergency services were dispatched to their home for her whilst she is away. From the IP telephone service, the emergency dispatch services had no way of knowing her location.

As shown in the new telephone services, there is a need for a fundamentally new solution to provide the correct location of a caller during an emergency call.

BRIEF SUMMARY OF THE INVENTION

A method and system for determining if a phone has changed locations includes a subscriber phone equipment coupled to a phone system through a subscriber access line. The subscriber phone equipment includes a location test module and a datastore. The location test module includes a first subscriber access line identity for the subscriber access line. The datastore includes a first subscriber location for the first subscriber access line identity. The location test module obtains a second subscriber access line identity for the subscriber access line, obtains a second subscriber location for the second subscriber access line identity, and compares the first subscriber location and the second subscriber location. If the first subscriber location does not match the second subscriber location, then the subscriber phone equipment has changed locations. If the first subscriber location matches the second subscriber location, then the subscriber phone equipment has not changed locations.

In one embodiment, the system includes a subscriber location query system, where the subscriber location query system includes a second datastore. The second datastore includes a plurality of subscriber location records, where each subscriber location record includes a subscriber access line identity attribute and a corresponding subscriber location attribute. When the subscriber location query system receives a query from the location test module, the query including the second subscriber access line identity, the subscriber location query system compares the second subscriber access line identity from the query to the subscriber access line identity attribute of the plurality of subscriber location records. If a match is found, the subscriber location query system returns to the location test module the second subscriber location according to the matching subscriber location record.

DETAILED DESCRIPTION OF THE INVENTION

Figure 1:
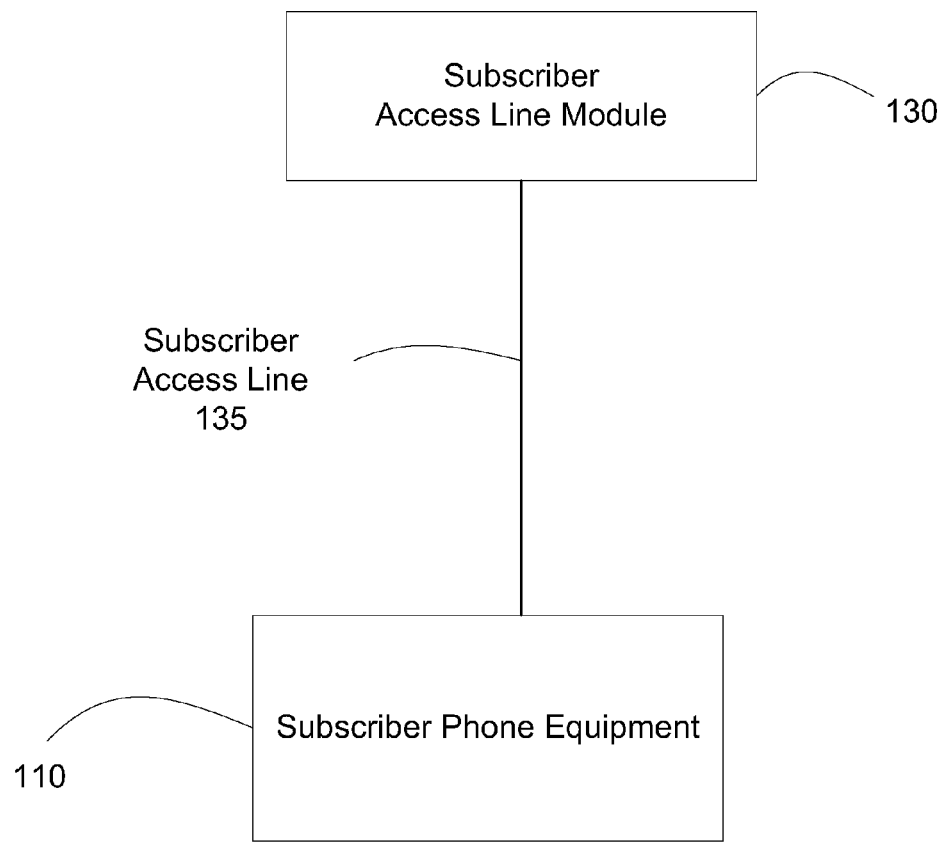
FIG. 1 is a block diagram illustrating the connections between subscriber access line module and subscriber phone equipment through a subscriber access line.

Subscriber Phone Equipment, Subscriber Access Line, and Subscriber Access Line Module FIG. 1 illustrates a subscriber access line module 130 connection to subscriber phone equipment 110. Subscriber phone equipment 110 connects to subscriber access line module 130 via a subscriber access line 135. Subscriber access line module 130 can connect to multiple subscriber phone equipment simultaneously through multiple subscriber access lines. Each subscriber access line 135 has a subscriber access line identity. Each subscriber access line 135 has a subscriber location. The subscriber location of a subscriber access line 135 is the location where the subscriber access line 135 connects to subscriber phone equipment 110. In one embodiment, a subscriber location includes a street address. In another embodiment, a subscriber location includes a building number. In yet another embodiment, a subscriber location includes a room number. In one embodiment, a subscriber location includes a cubicle number. In a different embodiment, a subscriber location includes a geophysical location.

Subscriber access line module 130 manages the association between a subscriber access line 135 and the subscriber access line identity that identifies the subscriber access line 135. In one embodiment, subscriber access line module 130 includes a Master Distribution Frame (MDF). In another embodiment, subscriber access line module 130 includes a Digital Access Line Access Module (DSLAM). In yet another embodiment, subscriber access line module 130 includes a Digital Loop Carrier (DLC). In a different embodiment, subscriber access line module 130 includes Cable Headend equipment, such as a Cable Modem Termination System (CMTS) or a Cable Data Modem Termination System (CDMTS). In another embodiment, subscriber access line module 130 includes radio network access equipment. In one embodiment, the radio network access equipment includes a Wi-Fi access point, a Worldwide Interoperability for Microwave Access (WiMax) access point, an Ultra-Wideband (UWB) base station, or a cellular base station. In one embodiment, the radio access equipment includes a base station controller (BSC).

In one embodiment, subscriber access line 135 includes a copper local loop. In another embodiment, subscriber access line 135 includes a coaxial cable. In another embodiment, subscriber access line 135 includes a radio frequency band. In one embodiment, subscriber access line 135 includes a multiplex channel within the radio frequency band. In another embodiment, the multiplex channel is based on Time Division Multiplexing Access (TDMA) technology. In another embodiment, the multiplex channel is based on Code Division Multiplexing Access (CDMA) technology. In yet another embodiment, the multiplex channel is based on Frequency Division Multiplexing Access (FDMA) technology.

Subscriber Location Record and Subscriber Location Datastore

Figure 2:
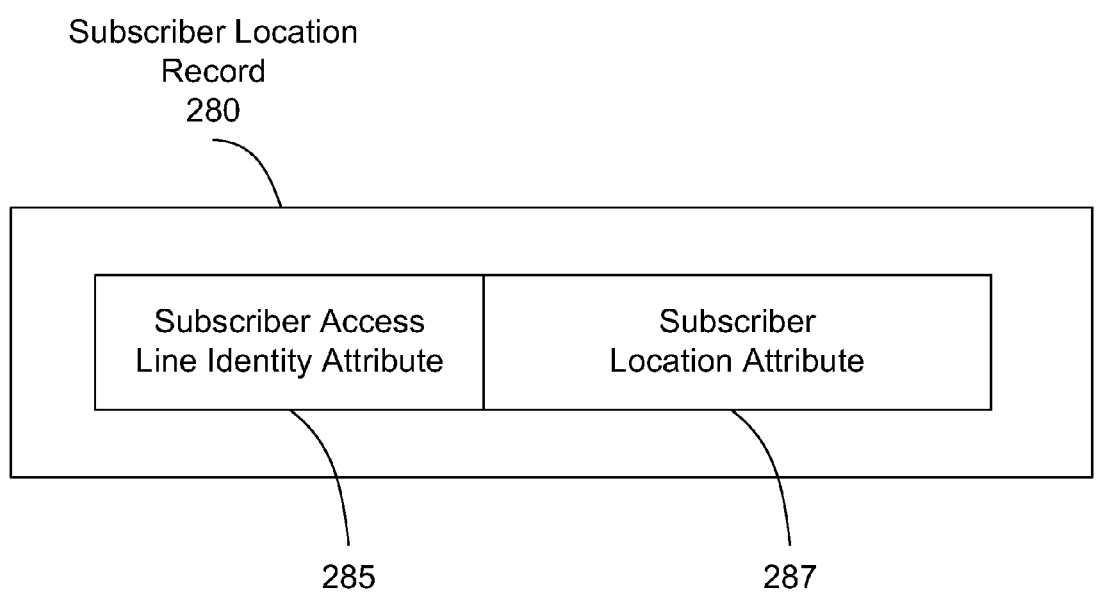
FIG. 2 is a block diagram illustrating a subscriber location record.

FIG. 2 illustrates a subscriber location record. A subscriber location record 280 comprises a subscriber access line identity attribute 285 and a subscriber location attribute 287. In one embodiment, subscriber access line identity attribute 285 includes the subscriber access line identity of a subscriber access line. In one embodiment, subscriber location attribute 287 includes the subscriber location of the subscriber access line. The location stored in the subscriber location attribute can be a physical address such as a street address, a building number, a cubicle number, or geophysical location coordinates.

Subscriber Location Datastore and Subscriber Location Query System

Figure 3:
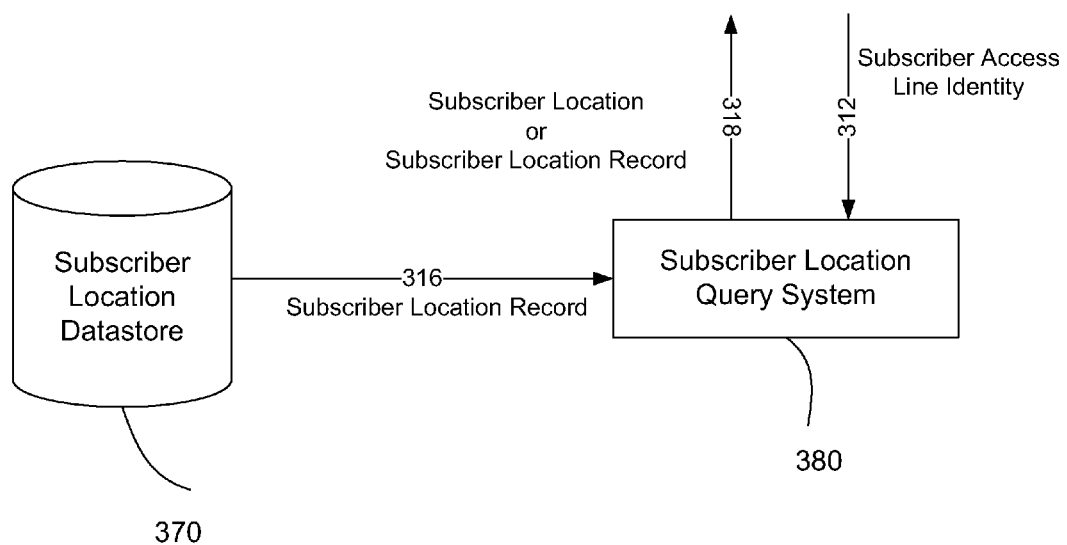
FIG. 3 is a block diagram illustrating the connections between a subscriber location datastore and a subscriber location query system.

FIG. 3 illustrates a process for querying a subscriber location. Subscriber location datastore 370 connects to a subscriber location query system 380. Subscriber location datastore 370 includes a plurality of subscriber location records. Subscriber location query system 380 receives a query for a subscriber location. The query includes a subscriber access line identity 312. In one embodiment, subscriber location query system 380 compares the subscriber access line identity with the subscriber access line identity attribute of multiple subscriber location records in subscriber location datastore 370. If a matching subscriber location record exists, subscriber location query system 380 selects one or more of the matching subscriber location record 316.

Subscriber location query system 380 sends the result 318 in response to the query. In one embodiment, the result 318 is the subscriber location extracted from the subscriber location attribute of the selected subscriber location record 316. In another embodiment, the result is one or more of the selected subscriber location record 316.

In one embodiment, subscriber location query system 380 receives the query from a network. In one embodiment, the network is a Signaling System 7 (SS7) network. In another embodiment, the network is an Internet Protocol (IP) network. In yet another embodiment, subscriber location query system 380 receives the query over a circuitry connection. In a different embodiment, subscriber location query system 380 receives the query over an Application Programming Interface (API). In a one embodiment, subscriber location query system 380 receives the query via a standard base database access protocol. In another embodiment, subscriber location query system 380 receives the query via a proprietary protocol.

A Method of Obtaining Subscriber Location During a Call

Figure 4:
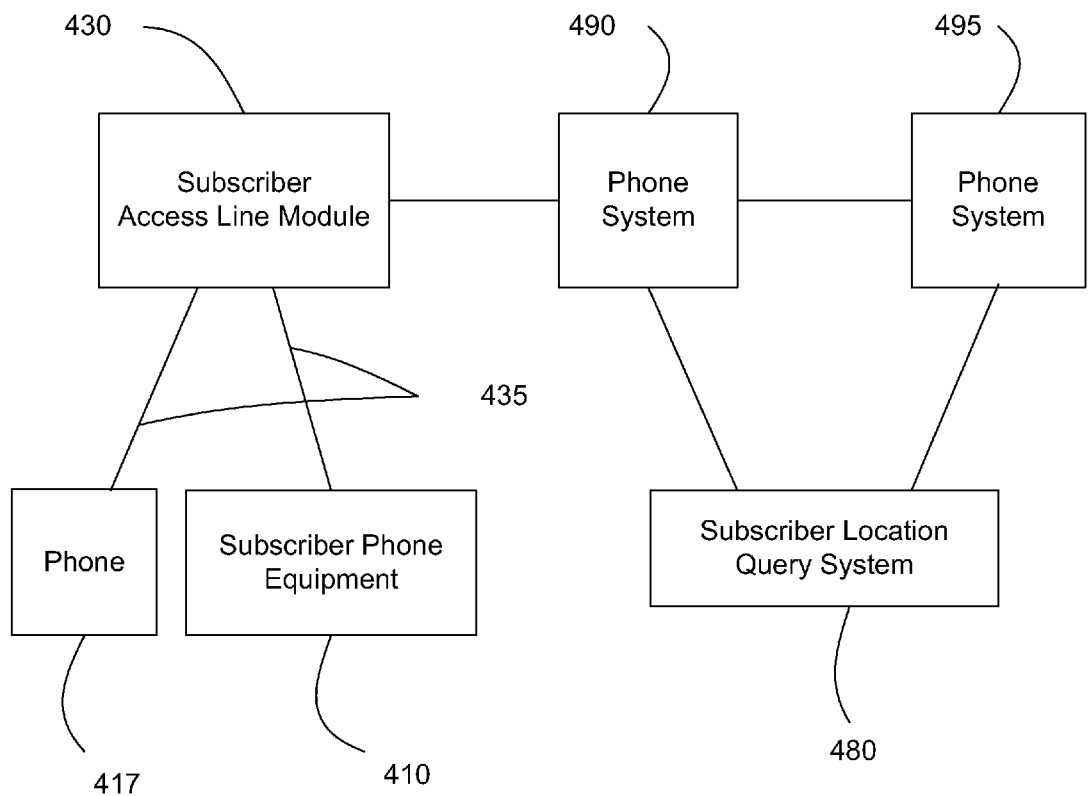
FIG. 4 is a block diagram illustrating a system for obtaining a subscriber location during a call.

FIG. 4 illustrates a system for obtaining a subscriber location during a call.

Subscriber phone equipment 410 connects to a subscriber access line module 430 over a subscriber access line 435. A phone 417 connects to subscriber access line module 430 over the subscriber access line 435. Subscriber access line module 430 connects to a phone system 490. A user uses phone 417 to make a call.

Phone system 490 receives and processes the call from phone 417. Phone system 490 determines the subscriber access line identity of the subscriber access line as to where phone 417 is connected.

In one embodiment, phone system 490 determines the subscriber access line identity by correlating the resources in phone system 490. In one embodiment, the resources include a line card and a port. In another embodiment, the resources include a multiplexing channel in the communications media between phone system 490 and subscriber access line module 430.

In another embodiment, phone system 490 determines the subscriber access line identity by querying subscriber access line module 430. In one embodiment, phone system 490 queries subscriber access line module 430 during processing of the call. In another embodiment, phone system 490 queries subscriber access line module 430 before the call.

In another embodiment, phone system 490 connects to subscriber phone equipment 410. Subscriber phone equipment 410 obtains the subscriber access line identity of subscriber access line 435 from subscriber access line module 430. Phone system 490 determines the subscriber access line identity by querying subscriber phone equipment 410. In one embodiment, phone system 490 queries subscriber phone equipment 410 during processing of the call. In another embodiment, phone system 490 queries subscriber phone equipment 410 before the call.

In yet another embodiment, phone 417 stores, includes or otherwise has the subscriber access line identity of subscriber access line 435. Phone system 490 determines the subscriber access line identity from phone 417. In one embodiment, phone system 490 determines the subscriber access line identity from phone 417 during processing of the call. In another embodiment, phone system 490 determines the subscriber access line identity from phone 417 before the call.

In FIG. 4, phone system 490 connects to a subscriber location query system 480. Phone system 490 sends a query to subscriber location query system 480. The query includes the determined subscriber access line identity. Phone system 490 receives a subscriber location from subscriber location query system 480.

In one embodiment, phone system 490 connects to another phone system 495. Phone system 490 sends a call request to phone system 495. In one embodiment, phone system 490 includes the determined subscriber access line identity in the call request phone system 495 receives the determined subscriber access line identity from phone system 490. Phone system 495 determines the subscriber location from the received subscriber access line identity by querying subscriber location query system 480.

A method of obtaining the location of a caller during an emergency call.

Figure 5:
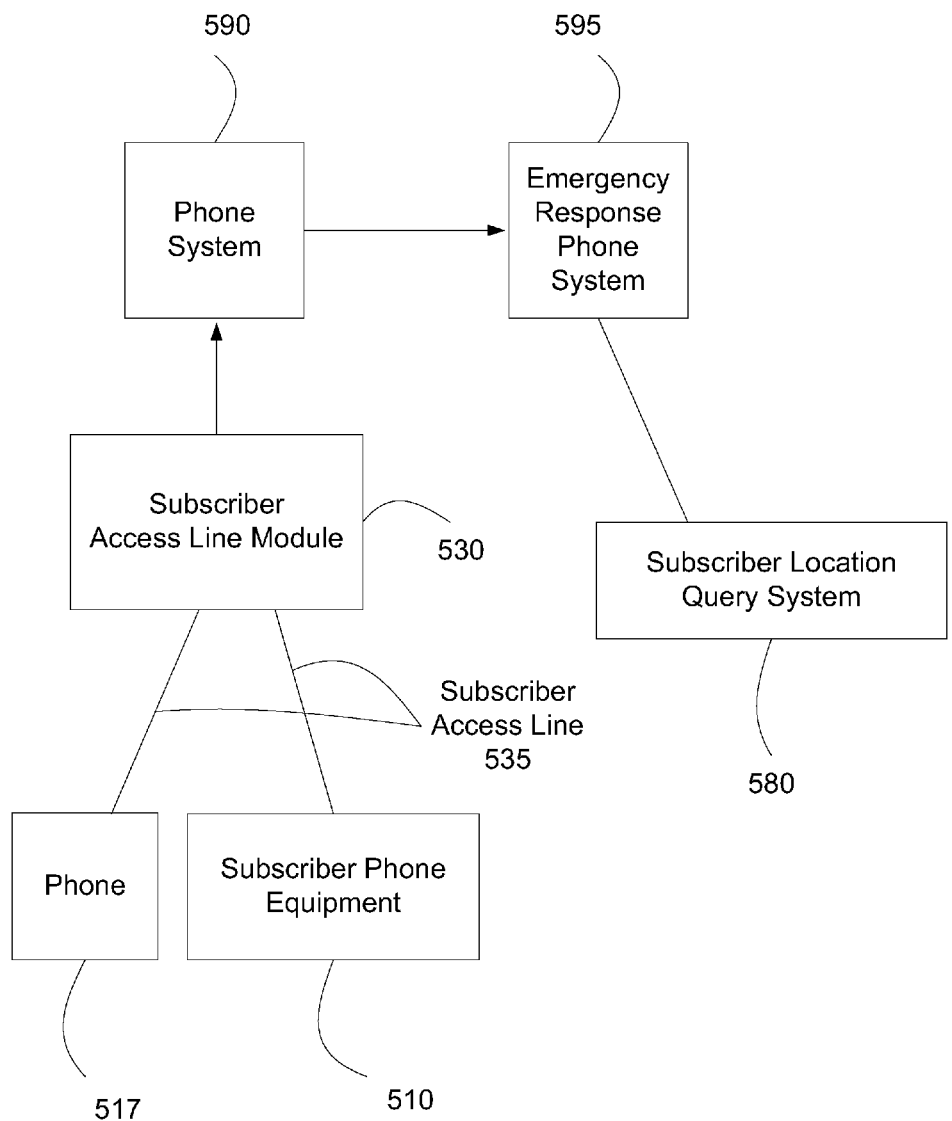
FIG. 5 is a block diagram illustrating a system for handling an emergency call.

FIG. 5 illustrates a method of handling an emergency call. Phone system 590 connects to an emergency response phone system 595. Emergency response phone system 595 comprises one or more phone systems. Emergency response phone system 595 connects to subscriber location query system 580. Subscriber phone equipment 510 connects to a subscriber access line module 530 over a subscriber access line 535. Phone 517 connects to subscriber access line module 530 over the subscriber access line 535. Subscriber access line module 530 connects to phone system 590.

A user makes an emergency call by dialing an emergency number at phone 517. In one embodiment, the emergency number is "Emergency". In another embodiment, the emergency number is "999". In yet another embodiment, the emergency number is "911". Phone system 590 receives the emergency call, and determines the subscriber access line identity of subscriber access line 535 as illustrated in FIG. 4.

Phone system 590 routes the emergency call to emergency response phone system 595 and sends the determined subscriber access line identity to emergency response phone system 595.

Emergency response phone system 595 receives the emergency call and the subscriber access line identity. Emergency response phone system 595 determines the subscriber location by querying the subscriber location query system 580 using the received subscriber access line identity. Emergency response phone system 595 presents the emergency call, including the subscriber location, to an agent. The agent dispatches emergency personnel to subscriber location. In one embodiment, the agent dispatches emergency personnel to the street address indicated in the subscriber location. In an embodiment, the agent dispatches emergency personnel to the cubical of a building indicated in the subscriber location. In a different embodiment, the agent dispatches emergency personnel to search in the geophysical location indicated in the subscriber location.

Figure 6:
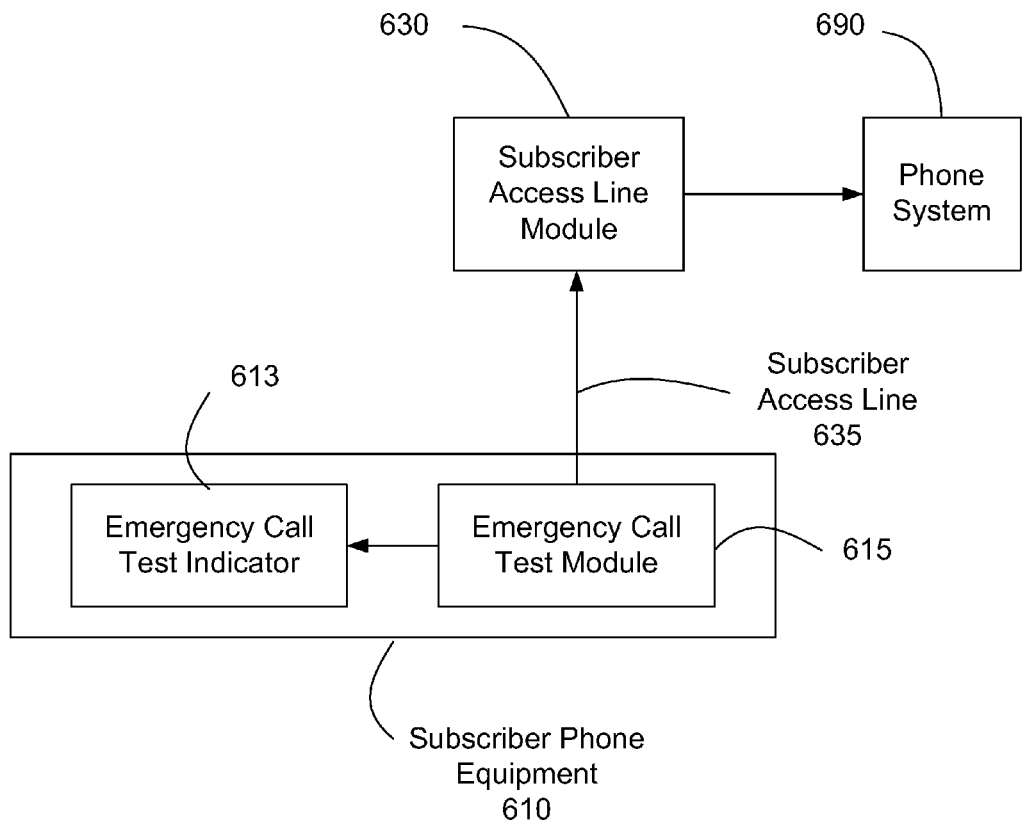
FIG. 6 is a block diagram illustrating a method of testing whether or not an emergency call can be made using a subscriber access line.

A Method of Obtaining if an Emergency Call can be Made Using a Subscriber Access Line FIG. 6 illustrates a method of obtaining if an emergency call can be made using a subscriber access line. Subscriber phone equipment 610 includes an emergency call test module 615. Subscriber phone equipment 610 connects to subscriber access line module 630 over subscriber access line 635. Subscriber access line module 630 connects to a phone system 690. Emergency call test module 615 performs a test to determine if an emergency call can be made using the subscriber access line 635.

In one embodiment, emergency call test module 615 queries subscriber access line module 630. Subscriber access line module 630 responds with an indication whether or not an emergency call can be made. Emergency call test module 615 checks the indication. If the indication is positive, emergency call test module 615 determines that an emergency call can be made using the subscriber access line 635.

In another embodiment, subscriber phone equipment 630 connects to phone system 690. Emergency call test module 615 queries phone system 690. Phone system 690 responds with an indication whether or not an emergency call can be made. Emergency call test module 615 checks the indication. If the indication is positive, emergency call test module 615 determines that an emergency call can be made using the subscriber access line 635.

In one embodiment, emergency call test module 615 sends an off hook signal towards subscriber access line 635, and checks for an indication of a dial tone. If the indication is positive, emergency call test module 615 determines that an emergency call can be made using the subscriber access line 635.

In one embodiment, emergency call test module 615 repeats the process a multiple times before determining if an emergency call can be made using the subscriber access line 635.

In one embodiment, subscriber phone equipment 610 connects to a telephone. Subscriber phone equipment 610 informs the telephone if an emergency call can be made using the subscriber access line 635.

In one embodiment, subscriber phone equipment 610 further includes an emergency call test indicator 613. Emergency call test module 615 connects to an emergency call test indicator 613. In one embodiment, emergency call test indicator 613 includes a visual indicator such as a light or display.

In one embodiment, emergency call test indicator 613 includes a LED as the visual indicator. If emergency call test module 615 determines that an emergency call can be made using the subscriber access line 635, emergency call test module 615 turns the LED or other visual indicator to green. In one embodiment, if emergency call test module 615 cannot determine an emergency call can be made using the subscriber access line 635, emergency call test module 615 turns the LED to red.

In another embodiment, emergency call test indicator 613 includes a text display panel. If emergency call test module 615 determines an emergency call can be made using the subscriber access line 635, emergency call test module 615 displays "emergency call Test Succeeds" on the display panel. In one embodiment, emergency call test module 615 cannot determine that an emergency call can be made using the subscriber access line 635 emergency call test module 615 displays "emergency call Test fails" on the display panel.

In one embodiment, emergency call test module 615 determines repeatedly if an emergency call can be made using the subscriber access line 635. In one embodiment, emergency call test module 615 performs the process every 30 minutes. In another embodiment, emergency call test module 615 performs the process every hour. In yet another embodiment, emergency call test module 615 performs the process when subscriber phone equipment 610 powers up. In a different embodiment, emergency call test module 615 performs the process when a telephone call is made.

Figure 7:
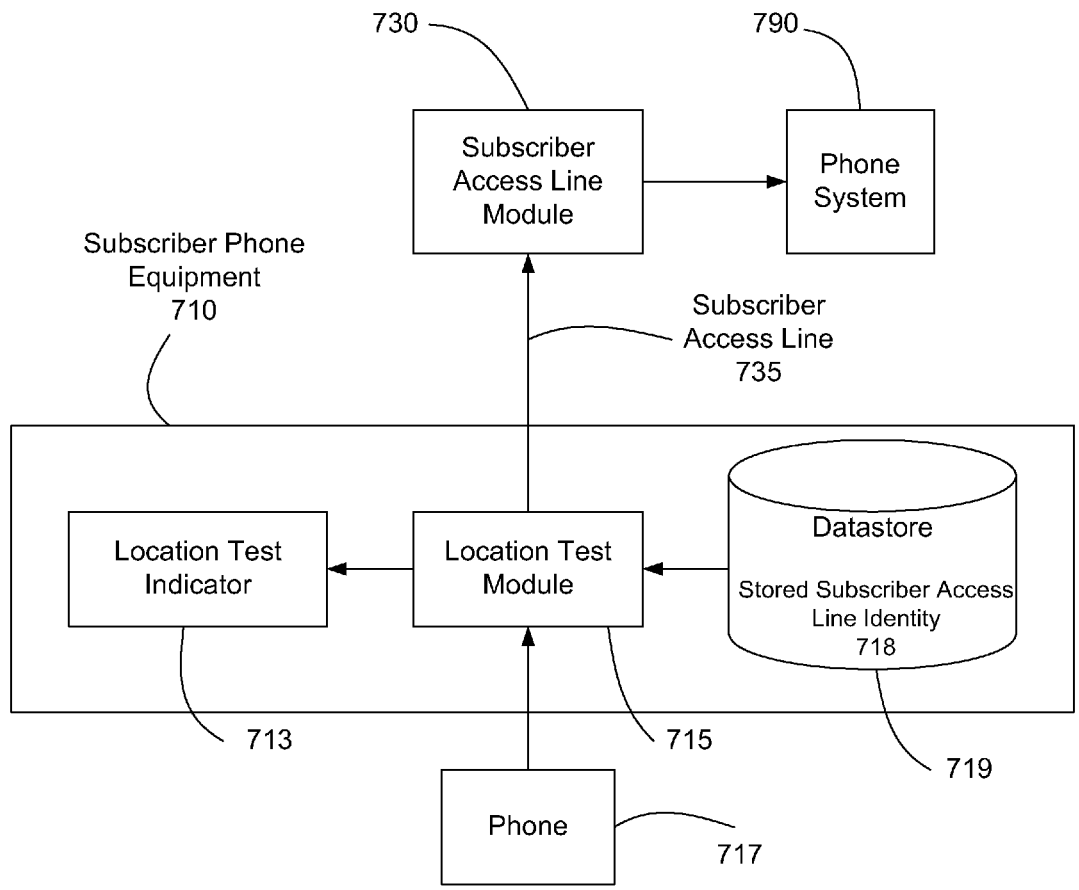
FIG. 7 is a block diagram illustrating a system for determining whether or not subscriber phone equipment has changed location.

A Method of Determining Whether or not Subscriber Phone Equipment has Changed Location FIG. 7 illustrates a process to determine whether or not subscriber phone equipment has changed location. Subscriber phone equipment 710 includes a location test module 715.

A Method of Determining Whether or not Subscriber Phone Equipment has Changed Location Based on Subscriber Access Line Identity In one embodiment, location test module 715 determines whether or not subscriber phone equipment 710 has changed location by examining the subscriber access line identity of subscriber access line 735. Subscriber phone equipment 710 connects to subscriber access line module 730 over subscriber access line 735. Subscriber access line module 730 connects to a phone system 790.

In one embodiment, location test module 715 connects to datastore 719. Datastore 719 stores a stored subscriber access line identity 718. The stored subscriber access line identity 718 is a subscriber access line identity identifying a subscriber access line with subscriber location being the correct location of the subscriber phone equipment 710. In one embodiment, datastore 719 is a flash memory. In another embodiment, datastore is a hard disk. In yet another embodiment, datastore 719 is a memory.

Location test module 715 obtains the stored subscriber access line identity 718 and stores the stored subscriber access line identity 718 in datastore 719. In one embodiment, the stored subscriber access line identity 718 is determined when the service provider establishes a service for the subscriber. In one embodiment, during service establishment, the service provider informs the location test module 715 of the stored subscriber access line identity 718. In another embodiment, location test module 715 obtains from subscriber access line module 730 the stored subscriber access line identity 718. In another embodiment, stored subscriber access line identity 718 is determined during a service change. In another scenario, the subscriber moves subscriber phone equipment 710 to a new location, and submits a new address to the service provider. The service provider determines a new stored subscriber access line identity 718. In another embodiment, the service provider informs the location test module 715 of the new stored subscriber access line identity 718. In yet another embodiment, location test module 715 obtains from subscriber access line module 730 the new stored subscriber access line identity 718.

In one embodiment, location test module 715 connects to a phone system 790. Location test module 715 obtains the stored subscriber line identity 718 from phone system 790.

In one embodiment, location test module 715 connects to a phone 717. Location test module 715 obtains stored subscriber access line identity 718 from phone 717.

In one embodiment, location test module 715 is informed when a new stored subscriber line identity 718 is available. In another embodiment, location test module 715 checks for a new stored subscriber line identity 718. In an embodiment, location test module 715 checks every 5 minutes. In a different embodiment, location test module 715 checks every hour.

Location test module 715 determines whether or not subscriber phone equipment 710 has changed location by matching the stored subscriber access line identity 718 against the subscriber access line identity of subscriber access line 735. If the match succeeds, location test module 715 concludes that subscriber phone equipment 710 has not changed location.

In one embodiment, location test module 715 obtains the subscriber access line identity of subscriber access line 735 from subscriber access line module 730. In another embodiment, location test module 715 obtains the subscriber access line identity of subscriber access line 735 from phone system 790. In yet a different embodiment, location test module 715 obtains the subscriber access line identity of subscriber access line 735 from phone 717.

A Method of Determining Whether or not Subscriber Phone Equipment has Changed Location in Voice Over IP (VoIP) Phone Services In one embodiment, phone 717 connects to phone system 790 based on VoIP service. Phone 717 has an IP address. Phone 717 has an IP address as seen by phone system 790.

In one embodiment, location test module 715 sends a message to phone 717. In one embodiment, phone 717 responds with an indication about whether or not the IP address of phone 717 has changed. In another embodiment, phone 717 responds with an indication about whether or not the IP address of phone 717 as seen by phone system 790 has changed. Location test module 715 can determine based on the indication received from phone 717 whether or not subscriber phone equipment 710 has changed location.

In one embodiment, location test module 715 sends a message to phone system 790. In one embodiment, phone system 790 responds with an indication about whether or not the IP address of phone 717 has changed. In another embodiment, phone system 790 responds with an indication about whether or not the IP address of phone 717 as seen by phone system 790 has changed. Location test module 715 can determine based on the indication received from phone system 790 whether or not subscriber phone equipment 710 has changed location.

In one embodiment, location test module 715 sends a message to phone 717 and a message to phone system 790. Location test module 715 concludes that subscriber phone equipment 710 has not changed location if phone 717 responds that the IP address of phone 717 has not changed and phone system 790 responds that the IP address of phone 717 as seen by phone system 790 has not changed.

In another embodiment, location test module 715 tests whether or not subscriber phone equipment 710 has changed location every 30 minutes. In another embodiment, location test module 715 tests whether or not subscriber phone equipment 710 has changed location every hour. In yet another embodiment, location test module 715 tests whether or not subscriber phone equipment 710 has changed location when subscriber phone equipment 710 powers up. In a different embodiment, location test module 715 tests whether or not subscriber phone equipment 710 has changed location when a user makes a telephone call.

In one embodiment, subscriber phone equipment 710 connects to phone 717. Subscriber phone equipment 710 informs phone 717 whether or not subscriber phone equipment 710 has changed location. In one embodiment, subscriber phone equipment 710 further includes a location test indicator 713. Location test module 715 connects to the location test indicator 713.

In according to one embodiment, location test indicator 713 includes a visual indicator such as a light or a display. In one embodiment, the visual indicator is an LED. If location test module 715 determines that subscriber phone equipment 710 has not changed location, location test module 715 turns the LED to green. In one embodiment, if location test module 715 cannot determine that subscriber phone equipment 710 has not changed location, location test module 715 turns the LED to red. In another embodiment, the visual indicator is a display panel. If location test module 715 determines that subscriber phone equipment 710 has not changed location, location test module 717 displays "Location correct" on the display panel. If location test module 715 cannot determine that subscriber phone equipment 710 has not changed location, location Test module 717 displays "Location may be incorrect" on the display panel.

Figure 8:
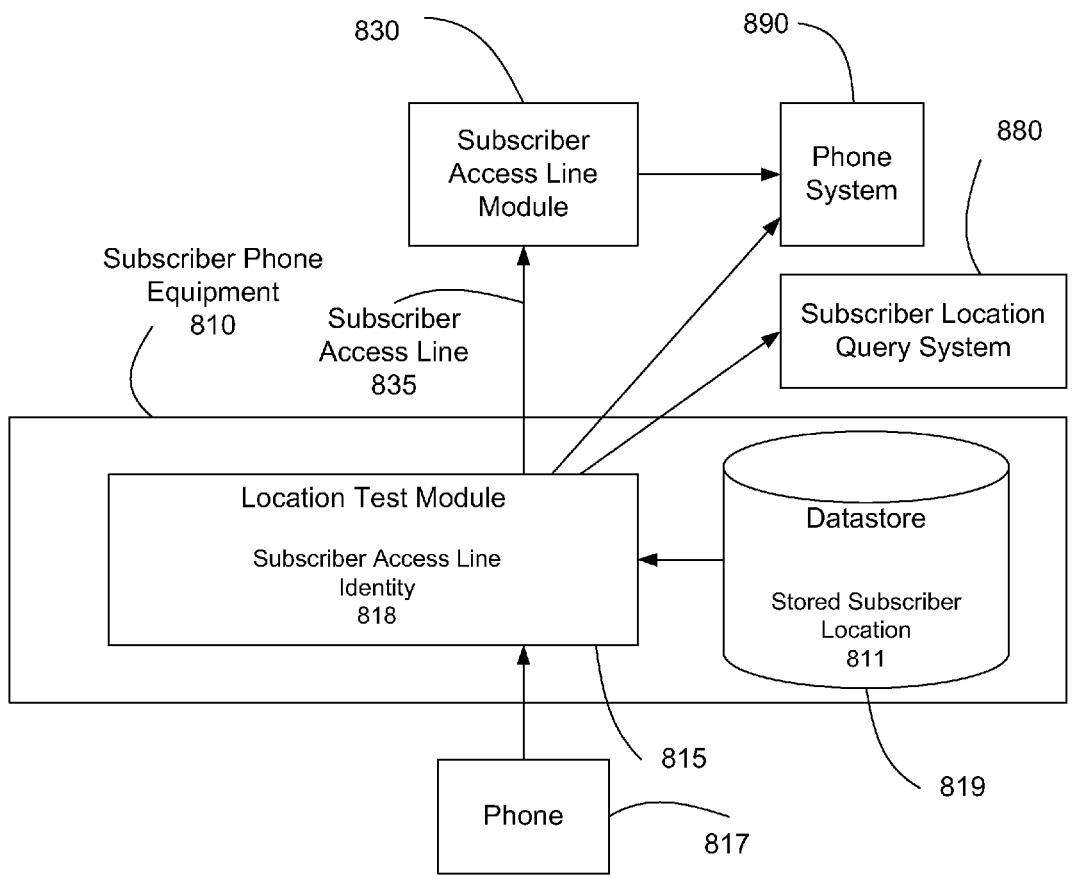
FIG. 8 illustrates a process to determine whether or not subscriber phone equipment has changed location based on subscriber location.

FIG. 8 illustrates a process to determine whether or not subscriber phone equipment has changed location based on subscriber location. Subscriber phone equipment 810 includes a location test module 815.

A Method of Determining Whether or not Subscriber Phone Equipment has Changed Location Based on Subscriber Location In one embodiment, location test module 815 determines whether or not subscriber phone equipment 810 has changed location by examining the subscriber location of subscriber access line 835. Subscriber phone equipment 810 connects to subscriber access line module 830 over subscriber access line 835. Subscriber access line module 830 connects to a phone system 890.

In one embodiment, location test module 815 connects to datastore 819. Datastore 819 stores a stored subscriber location 811. The stored subscriber location 811 is the location of the subscriber phone equipment 810. In one embodiment, datastore 819 is a flash memory. In another embodiment, datastore is a hard disk. In yet another embodiment, datastore 819 is a memory.

Location test module 815 obtains the stored subscriber location 811 and stores the stored subscriber location 811 in datastore 819. Location test module 815 obtains stored subscriber location 811 based on a subscriber access line identity 818. In one embodiment, subscriber access line identity 818 is determined when the service provider establishes a service for the subscriber. In one embodiment, during service establishment, the service provider informs the location test module 815 of subscriber access line identity 818. In another embodiment, location test module 815 obtains from subscriber access line module 830 subscriber access line identity 818. In another embodiment, subscriber access line identity 818 is determined during a service change.

In another scenario, the subscriber moves subscriber phone equipment 810 to a new location, and submits a new address to the service provider. The service provider determines a new subscriber access line identity 818. In another embodiment, the service provider informs the location test module 815 of the new subscriber access line identity 818. In yet another embodiment, location test module 815 obtains from subscriber access line module 830 the new subscriber access line identity 818.

In one embodiment, location test module 815 connects to a phone system 890. Location test module 815 obtains subscriber access line identity 818 from phone system 890.

In one embodiment, location test module 815 connects to a phone 817. Location test module 815 obtains subscriber access line identity 818 from phone 817.

In one embodiment, location test module 815 is informed when a new subscriber access line identity 818 is available. In another embodiment, location test module 815 checks for a new subscriber access line identity 818. In an embodiment, location test module 815 checks every 5 minutes. In a different embodiment, location test module 815 checks every hour.

In one embodiment, location test module 815 connects to a subscriber location query system 880. Location test module 815 sends a first query to subscriber location query system 880. The first query includes subscriber access line identity 818. Location test module 815 receives a subscriber location from subscriber location query system 880, and stores the received subscriber location as stored subscriber location 811 in datastore 819. In one embodiment, location test module 815 connects to subscriber location query system 880 over a network. In one embodiment, subscriber phone equipment 810 includes subscriber location query system 880.

In one embodiment, location test module 815 obtains subscriber location from phone system 890. In one embodiment, location test module 815 queries phone system 890 for subscriber location. In one embodiment, location test module 815 includes subscriber access line identity 818 in the query. In one embodiment, phone system 890 determines subscriber access line identity 818 by correlating the resources in phone system 890. Location test module 815 receives a subscriber location from phone system 890, and stored the received subscriber location as stored subscriber location 811.

Location test module 815 determines whether or not subscriber phone equipment 810 has changed location by matching the stored subscriber location 811 against the subscriber location of subscriber access line 835. Location test module 815 obtains the subscriber location of subscriber access line 835 by querying subscriber location query system 880.

In one embodiment, location test module 815 obtains the subscriber access line identity of subscriber access line 835 from subscriber access line module 830. In another embodiment, location test module 815 obtains the subscriber access line identity of subscriber access line 835 from phone system 890. In yet a different embodiment, location test module 815 obtains the subscriber access line identity of subscriber access line 835 from phone 817.

In one embodiment, location test module 815 sends a second query to subscriber location query system 880. The second query includes the subscriber access line identity of subscriber access line 835. Location test module 815 receives the subscriber location of subscriber access line 835.

In one embodiment, location test module 815 obtains subscriber location of subscriber access line 835 from phone system 890. In one embodiment, location test module 815 queries phone system 890 for a subscriber location. In one embodiment, location test module 815 includes subscriber access line identity of subscriber access line 835 in the query. In one embodiment, phone system 890 determines subscriber access line identity of subscriber access line 835 by correlating the resources in phone system 890. Location test module 815 receives subscriber location of subscriber access line 835 from phone system 890.

If the stored subscriber location 811 matches the subscriber location of subscriber access line 835, location test module 815 concludes that subscriber phone equipment 810 has not changed location. If the match fails, location test module 815 concludes that subscriber phone equipment 810 has changed location.

Combining Emergency Call Test and Location Test

In one embodiment, subscriber phone equipment includes an emergency call test module and a location test module. Subscriber phone equipment can perform both tests provided for by the emergency call test module and the location test module. In one embodiment, subscriber phone equipment further connects to a test indicator. The test indicator can include a visual indicator such as a light or a display.

In one embodiment, emergency call test module determines whether or not an emergency call can be made and location test module determines whether or not subscriber phone equipment has changed location. In one embodiment, emergency call test module determines that an emergency call can be made and determines that subscriber phone equipment has not changed locations; then subscriber phone equipment turns the visual indicator, such as an LED, to green. In another embodiment, emergency call test module determines that an emergency call can be made and location test module cannot determine whether or not subscriber phone equipment has changed location; then subscriber phone equipment turns the visual indicator, such as an LED, to yellow. In yet another embodiment, emergency call test module cannot determine that an emergency call can be made and location test module determines that subscriber phone equipment has not changed location; subscriber phone equipment turns the LED to amber. In one other embodiment, emergency call test module cannot determine that an emergency call can be made and location test module cannot determine that subscriber phone equipment has not changed location; subscriber phone equipment turns the LED to red.

In a different embodiment, the test indicator visual indicator is a display panel. Subscriber phone equipment displays corresponding messages on the display panel based on the combined test results of emergency call test module and location test module.

Subscriber Location Changes During an Emergency Call

While a user is making an emergency call, the user may move from a location to another location. The phone system handling the call can discover, from time to time, the subscriber access line identity of the subscriber access line to which the phone is connected. In one embodiment, after obtaining a subscriber access line identity, the phone system sends the subscriber access line identity to the emergency response phone system. In another embodiment, the phone system detects a change in subscriber access line identity, and sends the new subscriber access line identity to the emergency response phone system. The emergency response phone system further presents to the agent with an updated subscriber location.

A Method of Selecting a Phone System while Making Emergency Calls in a VoIP Service Scenario In FIG. 5, when a phone 517 makes an emergency call, phone 517 routes the emergency call to a phone system 590. In one embodiment, the telephone service is a VoIP service. The VoIP service provider is typically not the service provider for the subscriber access line 535. In one embodiment, the subscriber access line service provider offers telephone services and has a plurality of phone system from the subscriber access line service provider. When a user makes an emergency call, the user can select a phone system from the subscriber access line service provider to handle the emergency call.

In one embodiment, the phone 517 recognizes the emergency call and routes the emergency call to a phone system from the subscriber access line service provider. In another embodiment, the phone 517 is connected to the subscriber phone equipment 510. The subscriber phone equipment 510 recognizes the emergency call and routes the emergency call to a phone system from the subscriber access line service provider.

In another embodiment, the subscriber access line module 530 recognizes the emergency call and routes the emergency call to a phone system from the subscriber access line service provider.

Types of Phone Calls that Require Subscriber Location Information

The above description applies to emergency calls that require subscriber location information. However, there are many other scenarios in which would be helpful, advantageous or necessary to obtain the subscriber location of a telephone call. In one embodiment, phone system can use subscriber access line identities to determine the location information for calls such as location specific directory services, marketing information for premium pay per use phone services and toll-free service calls.

Described herein are techniques for methods and systems of obtaining the location of a caller during an emergency phone call. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

What is claimed is:

1. A method for storing a subscriber location, comprising:
   (a) providing a subscriber phone equipment coupled to a phone system through a subscriber access line, the subscriber phone equipment comprising:
      a location test module comprising a first subscriber access line identity for the subscriber access line, and
      a datastore comprising a first subscriber location for the first subscriber access line identity;
   (b) obtaining by the location test module a second subscriber access line identity for the subscriber access line;
   (c) obtaining by the location test module a second subscriber location for the second subscriber access line identity;
   (d) comparing by the location test module the first subscriber location and the second subscriber location, wherein the comparing (d) comprises:
      (d1) determining that the subscriber phone equipment has changed locations, if the first subscriber location does not match the second subscriber location; and
   (e) storing the second subscriber location in the datastore.

2. The method of claim 1, wherein the first subscriber location or the second subscriber location comprises a physical or link layer property of the subscriber access line.

3. The method of claim 1, wherein the location test module obtains the first subscriber access line identity or the second subscriber access line identity from a service provider.

4. The method of claim 3, wherein a service provided by the service provider comprises a directory service or a free service.

5. The method of claim 4, wherein the service comprises a first service provided based on the first subscriber location.

6. The method of claim 5, wherein the service comprises a second service provided based on the second subscriber location.

7. The method of claim 1, wherein the location test module obtains the first subscriber access line identity or the second subscriber access line identity from the phone system.

8. The method of claim 1, wherein the location test module sends a query to the phone system, the query comprising the first subscriber access line identity, wherein the location test module receives from the phone system the first subscriber location and stores the first subscriber location in the datastore.

9. The method of claim 1, wherein the obtaining (c) comprises:
   (c1) sending a query to a subscriber location query system, the query comprising the second subscriber access line identity; and
   (c2) receiving the second location from the subscriber location query system.

10. A method for storing a subscriber location, comprising:
    (a) providing a subscriber phone equipment coupled to a phone system through a subscriber access line, the subscriber phone equipment comprising:
       a location test module comprising a first subscriber access line identity for the subscriber access line, and
       a datastore comprising a first subscriber location for the first subscriber access line identity;
    (b) obtaining by the location test module a second subscriber access line identity for the subscriber access line;
    (c) obtaining by the location test module a second subscriber location for the second subscriber access line identity;
    (d) comparing by the location test module the first subscriber location and the second subscriber location, wherein the location test module obtains the first subscriber access line identity or the second subscriber access line identity from a service provider, wherein a service provided by the service provider comprises a directory service or a free service, wherein the service comprises a first service provided based on the first subscriber location and a second service provided based on the second subscriber location, wherein the comparing (d) comprises:
       (d1) determining that the subscriber phone equipment has changed locations, if the first subscriber location does not match the second subscriber location, wherein the second service provided based on the second subscriber location is different from the first service provided based on the first subscriber location; and
    (e) storing the second subscriber location in the datastore.

11. A system, comprising:
    a subscriber access line; and
    a subscriber phone equipment coupled to a phone system through the subscriber access line, the subscriber phone equipment comprising:
       a location test module comprising a first subscriber access line identity for the subscriber access line, and
       a datastore comprising a first subscriber location for the first subscriber access line identity,
    wherein the location test module obtains a second subscriber access line identity for the subscriber access line, obtains a second subscriber location for the second subscriber access line identity, compares the first subscriber location and the second subscriber location, and stores the second subscriber location in the datastore, wherein the location test module determines that the subscriber phone equipment has changed locations if the first subscriber location does not match the second subscriber location.

12. The system of claim 11, wherein the first subscriber location or the second subscriber location comprises a physical or link layer property of the subscriber access line.

13. The system of claim 11, wherein the location test module obtains the first subscriber access line identity or the second subscriber access line identity from a service provider.

14. The system of claim 13, wherein a service provided by the service provider comprises a directory service or a free service.

15. The system of claim 14, wherein the service comprises a first service provided based on the first subscriber location.

16. The system of claim 15, wherein the service comprises a second service provided based on the second subscriber location.

17. The system of claim 11, wherein the location test module obtains the first subscriber access line identity or the second subscriber access line identity from the phone system.

18. The system of claim 11, wherein the location test module sends a query to the phone system, the query comprising the first subscriber access line identity, wherein the location test module receives from the phone system the first subscriber location and stores the first subscriber location in the datastore.

19. The system of claim 11, wherein the location test module:
    sends a query to a subscriber location query system, the query comprising the second subscriber access line identity; and
    receives the second location from the subscriber location query system.

20. A system, comprising:
a subscriber access line; and
a subscriber phone equipment coupled to a phone system through the subscriber access line, the subscriber phone equipment comprising:
  a location test module comprising a first subscriber access line identity for the subscriber access line, and
  a datastore comprising a first subscriber location for the first subscriber access line identity,
  wherein the location test module obtains a second subscriber access line identity for the subscriber access line, obtains a second subscriber location for the second subscriber access line identity, compares the first subscriber location and the second subscriber location, and stores the second subscriber location in the datastore,
  wherein the location test module obtains the first subscriber access line identity or the second subscriber access line identity from a service provider, wherein a service provided by the service provider comprises a directory service or a free service, wherein the service comprises a first service provided based on the first subscriber location and a second service provided based on the second subscriber location, wherein the location test module determines that the subscriber phone equipment has changed locations, if the first subscriber location does not match the second subscriber location, wherein the second service provided based on the second subscriber location is different from the first service provided based on the first subscriber location.

* * * * *